(12) United States Patent
Larimore et al.

(10) Patent No.: US 7,630,963 B2
(45) Date of Patent: Dec. 8, 2009

(54) FAST RANKED FULL-TEXT SEARCHING

(75) Inventors: Stefan Isbein Larimore, Bellevue, WA (US); Tapas Kumar Nayak, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 10/609,933

(22) Filed: Jun. 30, 2003

(65) Prior Publication Data

US 2004/0267722 A1 Dec. 30, 2004

(51) Int. Cl.
*G06F 17/30* (2006.01)
(52) U.S. Cl. ................................. 707/3; 707/2; 707/102
(58) Field of Classification Search ........................ None
See application file for complete search history.

(56) References Cited

U.S. PATENT DOCUMENTS

| | | | | |
|---|---|---|---|---|
| 5,915,249 | A | * | 6/1999 | Spencer .......................... 707/5 |
| 6,105,023 | A | * | 8/2000 | Callan ............................ 707/5 |
| 7,039,633 | B1 | * | 5/2006 | Dey et al. ....................... 707/3 |

OTHER PUBLICATIONS

Brown, "Fast Evaluation of Structures Queries for Information Retrieval," Proceedings of the 18th annual international ACM SIGIR conference on Research and development in information retrieval, Jul. 1995, pp. 30-38.*

Kaszkiel et al., "Efficient Passage Ranking for Document Databases," ACM Transactions on Information Systems, vol. 17, No. 4, Oct. 1999, pp. 406-439.*

* cited by examiner

*Primary Examiner*—Kavita Padmanabhan
(74) *Attorney, Agent, or Firm*—Workman Nydegger

(57) ABSTRACT

Special lists can be used to perform fast ranked searching of documents containing key terms. The special lists are distinguished from basic inverted indices because they contain a ranking of only a predetermined number of documents that may be identified in the index. During a search, search engines can utilize the special lists to perform fast ranked searching without having to redundantly search through the entire corpus or index of documents available to the search engine. Rather, the search engine can search only the documents listed in the special list, thereby saving the time and resources required to perform the search. The search engine can also be configured to search a combination of the special lists and the index to provide users selective control over the balance between the accuracy and speed of the search.

24 Claims, 3 Drawing Sheets

FAST RANKED FULL-TEXT SEARCHING

BACKGROUND OF THE INVENTION

1. The Field of the Invention

The present invention relates to generally to the field of full-text searching and, more particularly, to methods and systems for performing ranked full-text searching for documents that contain key terms.

2. Background and Relevant Art

The World Wide Web (a.k.a., the "Internet") is a well-known resource that links millions of computers together. Through the Internet, it is possible to obtain access to an incredible quantity and variety of documents that are stored on various computing devices throughout the world. This abundant access to information, however, can make the task of identifying desired content a somewhat daunting and overwhelming task.

Accordingly, despite the seemingly unlimited access provided by the Internet, the ability to actually identify documents and other content that is desired can be limited by the tools that are used to search the Internet for the desired content. To provide assistance in searching the Internet and other repositories for desired content, search engines have been developed, including, but not limited to, MSN Search, Google, Alta Vista, Excite, Yahoo!, and so forth, that can search through the documents for desired content.

Existing search engines typically enable a user to enter one or more key terms that are related to a desired topic or content. The search engines then query the repository of documents to identify the documents that include the key term(s). The time it takes to search through all of the documents, however, can be undesirable. Accordingly, many search engines create indices to facilitate the search. These indices, also referred to as inverted indices, generally index key terms with the documents that contain the key terms, thereby reducing the burden on the search engine.

Although the use of indices can expedite the time it takes a search engine to perform a query, some indices have become so large that even the limited search through the indices can be undesirable. This problem is even further accentuated when the search engines use ranking algorithms to prioritize or rank the documents in a presumed order of relevance for the user.

Ranking the queried documents can be a valuable step for improving the accuracy of the search, and thereby increasing the likelihood that the documents presented to the user will contain the desired content. However, the additional time it takes to rank the documents can be very undesirable. Accordingly, in order to limit the processing requirements and time that are needed to rank the queried documents, some search engines only utilize ranking algorithms that require relatively few or minor calculations. Unfortunately, by minimizing the operations performed by the algorithm, the accuracy of the ranking can be compromised, thereby increasing the overall time it can take for a user to actually obtain the desired content.

BRIEF SUMMARY OF THE INVENTION

The present invention is directed to methods, systems and computer program products for enabling fast ranked searching of documents containing key terms. In particular, the embodiments of the invention provide for the creation and use of special Top-N lists, that are distinguished from basic inverted indices, and that identify only a limited number of documents in a search engine document corpus that are considered to be the top or most relevant documents.

In one embodiment, the special lists are created using probabilistic ranking, such that the special lists are ordered by key terms and include the documents that are most relevant to the associated key terms. The special lists can be configured to identify any number of documents that have been determined to be relevant to the corresponding key terms. The special lists can be appended to an inverted index or stored in any other suitable location that is accessible to the search engine.

During a search, the search engine can utilize the special lists to perform fast ranked searching without having to redundantly search through the entire corpus or index of documents available to the search engine. Rather, the search engine can be configured to search only the documents listed in the special list, thereby saving the time and resources required to perform the search. The search engine can also be configured to search a combination of the special lists and the basic index of the document corpus (e.g., the inverted index). In particular, controls can be utilized by the search engine to determine whether a search will consider only the documents identified in the special lists or other documents as well, thereby enabling users to selectively control the balance that is ultimately reached during the search, between accuracy and speed.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
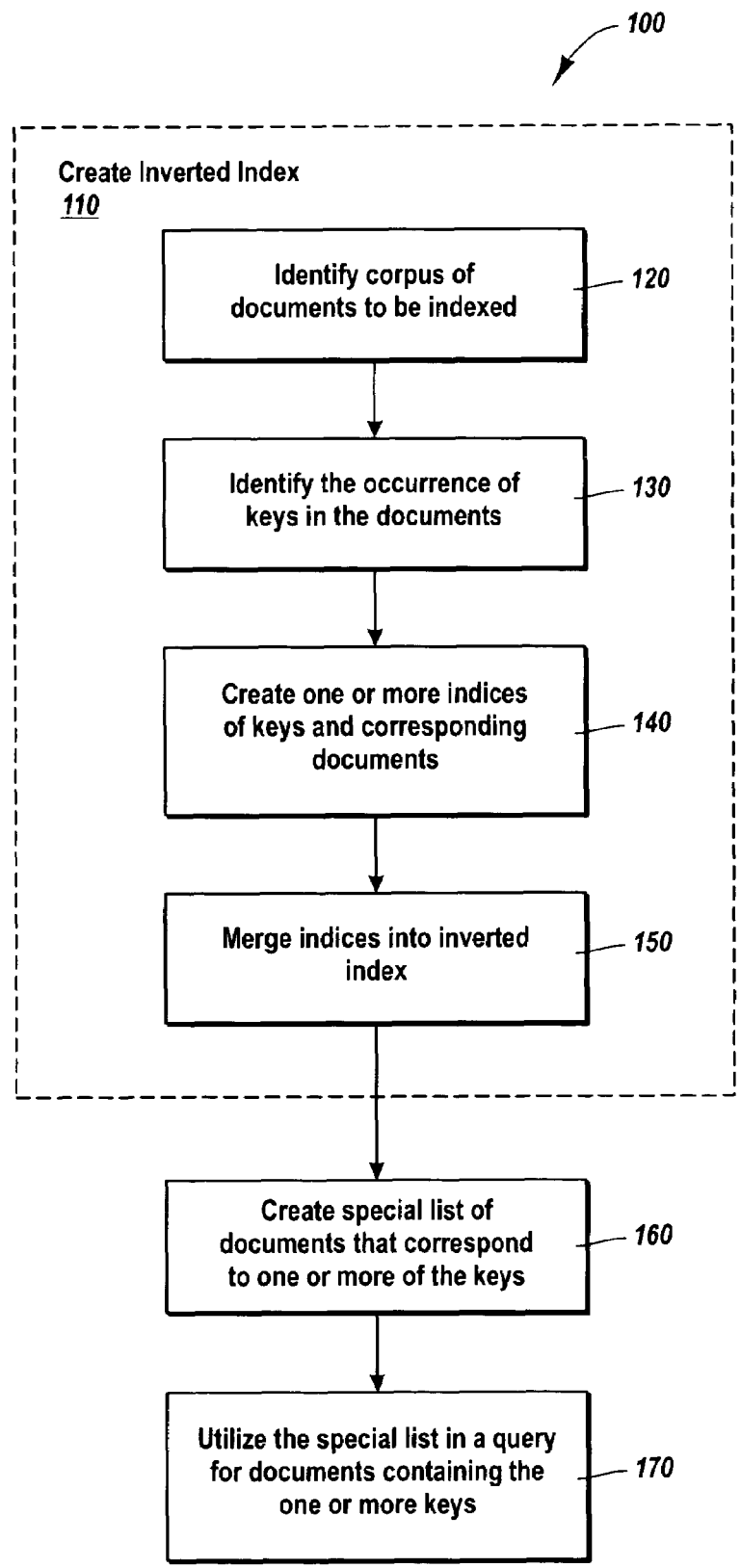
FIG. 1 illustrates a flow chart of one embodiment of a method for creating and utilizing special lists for enabling fast ranked searching of a document corpus.

The present invention is directed to methods, systems and computer program products for enabling fast ranked searching of documents containing key terms. In particular, the embodiments of the invention provide for the creation and use of special Top-N lists that are distinguished from the basic indices used to identify the documents available to a search engine.

In one embodiment, the special lists identify only a limited number of documents from the document corpus, which have been determined through ranking to be potentially more relevant to the corresponding key terms than the other documents in the corpus. Any desired ranking can be used to create the special lists, including, but not limited to probabilistic ranking, temporal ranking, vector ranking, and page ranking. Each of these ranking techniques are known to those of skill in the art.

It will be appreciated that the special lists can be configured to identify any number of documents based upon various criteria (e.g., number of totally available documents, perceived value of key terms, memory allocation, and so forth). Once created, the special lists can be appended to the index of the document corpus or stored in any other suitable location that is accessible to the search engine.

During a search, the search engine can utilize the special lists to perform fast ranked searching without having to redundantly search through the entire corpus or index of documents available to the search engine. Rather, the search engine can be configured to search only the documents listed in the special list, thereby saving the time and resources required to perform the search. The search engine can also be configured to search a combination of the special lists and other indices, thereby enabling users to selectively control the balance that is ultimately reached during the search, between accuracy and speed.

Although the present invention enables fast ranked full-text searching of documents, such as web page documents, it will be appreciated that the invention also extends to embodiments in which full-text searching is performed for other document types, such as profile page documents that identify specific information about various entities, and so forth. Accordingly, the scope of the invention can extend broadly to any full-text searching of any document type. Additional features and advantages of the invention will be described in more detail below and can be realized by practicing the invention.

As described herein, embodiments of the present invention can include special purpose and general-purpose computing devices including various computer hardware, as discussed in greater detail below. The embodiments within the scope of the present invention can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Certain embodiments of the invention will now be described with particular reference to the Figures.

FIG. 1 illustrates a flow-chart 100 of one method for enabling fast ranking of documents containing key terms. The illustrated method includes both a step (step 110) and various acts (acts 120, 130, 140, 150, 160, 170) that will each now be described. The first four acts (acts 120, 130, 140 and 150) correspond directly to the step for creating an inverted index (step 110). The term "inverted index," which is also used interchangeably with the term "index," "document corpus index," and "index of the document corpus," generally refers to an index that identifies documents that are available to a search engine. The inverted index typically identifies the documents by the key terms to which they correspond. Accordingly, an inverted index may actually identify the same document in several different instances, corresponding with the various terms found within the document. Some inverted indices may also include occurrence information, such as, for example, information that identifies the number of times and the locations in which the key terms are located within the documents.

The key terms that are indexed within the inverted index can include words, letters, characters, numbers, and any combinations thereof. It will be appreciated, however, that the expression "key term" can also include symbols. In practice, a user enters one or more key terms in a search engine UI (User Interface) that are to be searched for in a corpus of documents. Upon receiving the key term(s), the search engine identifies and searches the inverted index to identify any documents that include the key term(s). As described below, the search engine can also identify and search one or more special lists that contain a consolidated or abbreviated version of the inverted index. These special lists can be appended to the inverted index or stored separately.

Although embodiments of the invention can include the creation of an inverted index, it will be appreciated that the methods of the invention can also be performed upon receiving the inverted index from another source, without explicitly creating it.

When the methods of the invention do include creating an inverted index, the step for creating the inverted index (step 110) can include various combinations of corresponding acts. For example, creation of an inverted index can include an act of identifying the corpus of documents to be indexed (act 120) and identifying the occurrence of keys in the documents (act 130).

Typically, although not necessarily, the corpus of documents includes all of the documents that the search engine will have access to. These documents may include web pages or any other documents that are available for a full-text query. Once this group of documents is identified, they can then be scanned for key term occurrences (act 130). For example, each of the documents can be searched for the term "A", the term "AA", the term "AAA" and so forth. Although any number of key terms can be looked for within the documents, it is sometimes desirable to only search for the key terms that are actually anticipated to be used by the search engine, thereby minimizing the computing resources and time that are required to generate the inverted list.

Because the corpus of documents can be constantly changing or because of the shear size of the corpus, it may also be desirable to create a plurality of mini-indices (act 140) that are subsequently merged (act 150) into a composite inverted index. Nevertheless, it will be appreciated that the scope of the invention is not limited to embodiments in which the inverted index is created from a plurality of mini-indices. It is also not necessary that the inverted index comprise a consolidated single index. For example, the inverted index may actually comprise two or more indices that are stored in separate locations. Accordingly, it will be appreciated that the step for creating the inverted index (step 110) is not exclusively or exhaustively limited to the performance of the acts illustrated in FIG. 1.

Upon creating or obtaining the inverted index (step 110), the methods of the invention also include the creation of one or more special lists (act 160) that identify certain documents by the occurrence of key terms that are found within the documents. This list can comprise a ranking of the documents based on any criteria. For example, the special list(s) can rank documents based upon the document size, the frequency in which a term is recited in the document, the significance of certain terms, the type of term, combinations of the above, as well as any other desired criteria.

In one embodiment, the act of creating the special list includes the application of an algorithm to the documents identified in the inverted index. This application of the algorithm can occur at any time prior to, during, or subsequent to the creation of the inverted index. In one embodiment, however, the ranking algorithm is applied during merging of the two or more mini-indices into the composite inverted index.

It will be appreciated that the actual ranking algorithms that are used to create the special lists should not be construed as limiting features of the invention and will not, therefore, be described in any great detail.

During creation of a special list, a ranking algorithm can be applied to any number of the documents in the document corpus. The ranking algorithm is generally used to identify a top number of documents that correspond to each of the terms by ranking based on presumed importance or value.

In one embodiment, a ranking algorithm is applied to each document that has been associated with a key term in the inverted index. In so doing, a special list is created that ranks the documents in order of presumed importance. The special list can then be attached to the inverted index, along with the term to which it corresponds, or in another storage location. The special list may include all of the documents considered or only a predetermined number of the highest ranked documents.

In one embodiment, the ranking algorithm that is applied to the documents to create the special lists is a probabilistic ranking algorithm and includes the following: Rank=(tf/K+tf); wherein "K"=dl/avdl, "tf"=occurrence of a key term in a document, "dl"=document length, and "avdl"=the average document length of the documents being evaluated. However, as mentioned above, the actual ranking algorithm should not be construed as limiting the scope of the invention. Accordingly, the algorithm can be modified to accommodate any desired need or preference. Likewise, other types of ranking algorithms can be used, including, but not limited to temporal ranking, vector ranking, page ranking, and combinations thereof.

Once the special list is created, it can be utilized by a search engine or another tool to perform a fast search for the documents that contain the search terms. In other words, the speed of the search can be accelerated by searching only the special lists for potentially relevant documents, rather than all of the documents identified in the inverted index. To further accelerate the search, the size of the special lists can be limited in size, so that even fewer documents are considered. This, however, can create some reduction in the overall quality and accuracy of the search.

In alternative embodiments, the size of the special lists can also be configured to be somewhat large and exhaustive, thereby enabling a more thorough and complete search to be performed. This can be particularly useful, for example, to enable a more accurate search for phrases and combinations of key terms.

In yet additional embodiments, the size of the special lists can vary between different terms to accommodate the perceived value of the terms that are searched. For example, terms that are more frequently used may comprise more comprehensive special lists, and visa versa.

Although a search engine can be configured to search only the special lists, rather than the corresponding key term index entries, as described above, it will be appreciated that in certain embodiments, the special lists can also be searched in combination with at least some of the contents of the inverted index. For example, the search engine might be configured to search for a predefined number of documents. In such a situation, the predefined number of documents may exceed the total number of documents that are identified by the special list. Accordingly, upon searching the special list corresponding to a search term, the search engine may also proceed to search through the other identified documents that have been associated with the search term until the predefined number of documents have been searched.

In yet other embodiments, the search engines can be configured with user interfaces that allow a user to adjust the accuracy and thoroughness of the searches that are to be performed. When the accuracy of a search is set at higher levels, the search engine can apply additional ranking algorithms to the documents identified in the special lists, consider and evaluate additional documents identified in the inverted index, apply ranking algorithms to the additional documents, or any combination of the above. Although this may slow down the search, at least the user has control and can determine whether they are willing to sacrifice speed for thoroughness.

If the user does decide to speed up the search, the search engine can be configured to search only the special lists or only a portion of the special lists, and without searching the other documents identified in the inverted index or other portions of the inverted index. It will be appreciated that this can significantly increase the speed in which the search can be performed. One reason the time to perform the search is particularly reduced is because ranking of the documents is performed during creation of the special lists and does not, therefore, need to be performed during the search. Nevertheless, it may still be desirable, in some circumstances, to apply additional or more complete ranking algorithms to the documents identified in the special lists during the search phase so as to further increase the accuracy of the search. Even when new algorithms are applied, however, the time it takes to perform the search is still reduced because the new algorithms are not applied to the entire corpus of relevant documents, but only the documents that are identified in the special lists.

Figure 2:
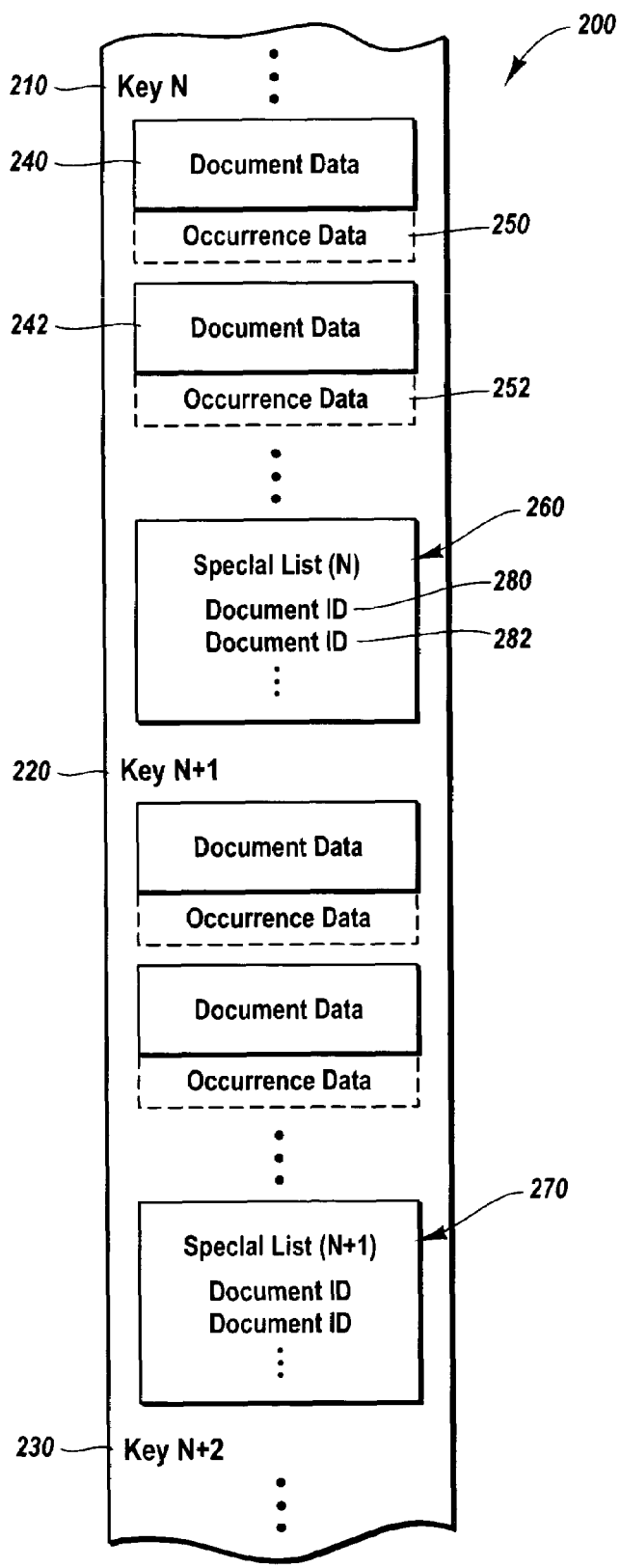
FIG. 2 illustrates one embodiment of an index associated with a document corpus that includes special Top-N lists that are appended to portions of the index.

Attention is now directed to FIG. 2 to illustrate one example of an inverted index that includes special lists that have been appended to the key terms to which they apply. As shown, the inverted index 200 includes several key terms (210, 220, 230) that have been indexed with the corresponding documents that contain the key terms to which they are indexed. For example, the key tern N 210 is shown to occur within Document 1 and Document 2. Accordingly, document 1 data (240) and document 2 data (242) are included in the inverted index to enable a search engine to identify the documents during a normal search query directed to the term "N". Corresponding occurrence data 250 and 252 can also be indexed to further reflect desired information, such as, but not limited to, the frequency a term occurs in the documents and the placement of the term within the document. Additional information that may be included in the document data or occurrence data can include the document size, languages utilized by the document, and any other related information.

According to one embodiment of the invention, a special list is created for each term that is supported by the index 200. However, it will be appreciated that special lists may be created for only selected key terms. As illustrated in FIG. 2, a special list 260 has been created for the term "N" and a special list 270 has also been created for the term "N+1". As mentioned above, the special list can be configured to include any number of the documents associated with a key term. If the total number of documents associated with a term is less than the predetermined size for a special list, then it may not be desirable to maintain a special list for that term.

As shown in the present embodiment, the special list 260 corresponding to key term N includes document identifiers 280 and 282. These identifiers can include any of the document data and occurrence data described above. Alternatively, these identifiers may simply comprise pointers, handles, or other references to the documents, document data and/or occurrence data. Accordingly, when a search engine examines the special list, it may be pointed to another location to obtain the information that is needed to present the corresponding documents to the user. Alternatively, the search engine can obtain the information directly from the special lists.

In one embodiment, the special list organizes the corresponding documents in order of rank, thereby making it easy to amend the special lists to accommodate new document entries added to the document corpus available to a search engine. For example, the ranking algorithm(s) an be applied to the new documents and the new documents can then be inserted into their appropriate locations within the special lists based upon their rank, assuming the new documents are ranked highly enough.

In one embodiment, the special list organizes the corresponding documents in order of rank, thereby making it easy to amend the special lists to accommodate new document entries added to the document corpus available to a search engine. for example, the ranking algorithm(s) can be applied to the new documents and the new documents can then be inserted into their appropriate locations within the special lists based upon their rank, assuming the new documents are ranked highly enough.

Despite the forgoing example, however, it will be appreciated that the special lists do not need to arrange the listed documents in any particular order. Rather, the documents can be assigned a rank value that is stored with the documents in the special list for later reference. Then, during a search, the search engine can quickly scan the listed documents and their corresponding rank to determine which of the documents should be presented to a user.

One advantage that can be realized from storing the ranking values for the documents in the special list is that these ranking values can later be used by the search engine to generate a composite rank of the documents that are identified during queries of two or more key terms.

In summary, the present invention enables the fast ranked searching of documents by key term with the use of special lists. The special lists are created prior to the actual searching that is performed by search engines, such that the ranking analysis can be limited to fewer documents during the search itself, and thereby reducing the time and resources that are required to perform the search. Embodiments of the invention also enable a user to customize the degree in which the special lists are used, thereby controlling the accuracy and speed in which a search can be performed.

Although specific examples have been provided above, it will be appreciated that the scope of the invention is not limited to the examples that have been provided. For example, the inverted index and special lists can also be used with additional files and indexes that correlate words or other key terms, so as to enable searches performed for key term synonyms and so forth.

Likewise, although in the present example, the special lists are shown as being appended to the ends of the key term entries within the inverted index 200, it will be appreciated that the invention is not limited to any particular embodiment or location for storing the special lists. In fact, the special lists can actually be stored away from the inverted index entirely, such as in a separate storage media. Furthermore, even though the special lists have at times been referred to as Top-N lists, the invention is not limited to any particular name type or configuration for the special lists.

Computing Environment

It will be appreciated by those skilled in the art that the invention may be practiced in computing systems and network computing environments with various configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 3:
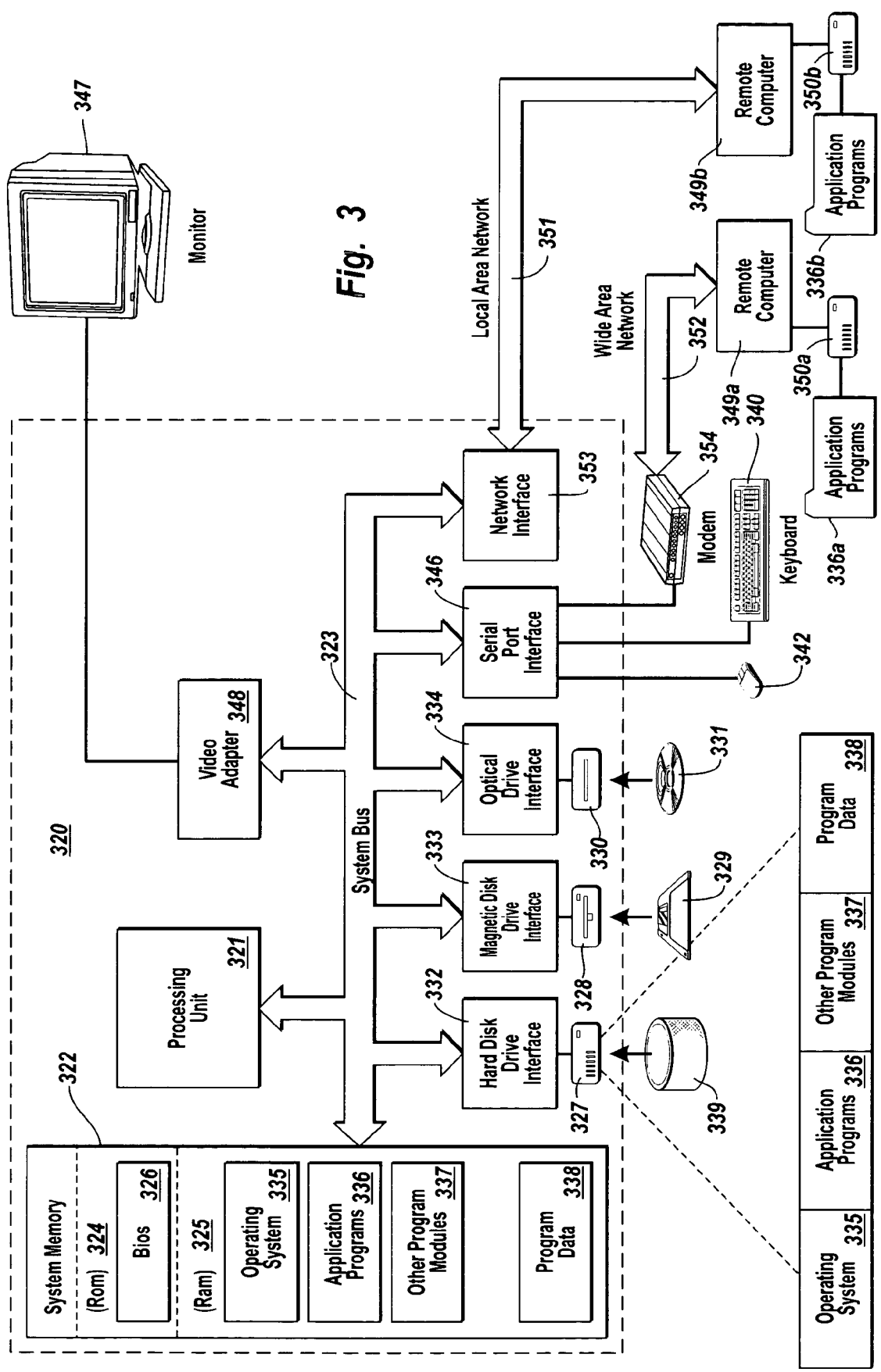
FIG. 3 illustrates a block diagram of one embodiment of a computing environment that may be used while performing methods of the invention.

With reference to FIG. 3, an exemplary system for implementing the invention includes a general purpose computing device in the form of a conventional computer 320, including a processing unit 321, a system memory 322, and a system bus 323 that couples various system components including the system memory 322 to the processing unit 321. The system bus 323 may be any of several types of bus structures including a memory bus or memory controller, a peripheral bus, and a local bus using any of a variety of bus architectures. The system memory includes read only memory (ROM) 324 and random access memory (RAM) 325. A basic input/output system (BIOS) 326, containing the basic routines that help transfer information between elements within the computer 320, such as during start-up, may be stored in ROM 324.

The computer 320 may also include a magnetic hard disk drive 327 for reading from and writing to a magnetic hard disk 339, a magnetic disk drive 328 for reading from or writing to a removable magnetic disk 329, and an optical disk drive 330 for reading from or writing to removable optical disk 331 such as a CD-ROM, DVD-ROM or other optical media. The magnetic hard disk drive 327, magnetic disk drive 328, and optical disk drive 330 are connected to the system bus 323 by a hard disk drive interface 332, a magnetic disk drive-interface 333, and an optical drive interface 334, respectively. The drives and their associated computer-readable media provide nonvolatile storage of computer-executable instructions, data structures, program modules and other data for the computer 320. Although the exemplary environment described herein employs a magnetic hard disk 339, a removable magnetic disk 329 and a removable optical disk 331, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 339, magnetic disk 329, optical disk 331, ROM 324 or RAM 325, including an operating system 335, one or more application programs 336, other program modules 337, and program data 338. A user may enter commands and information into the computer 320 through keyboard 340, pointing device 342, or other input devices (not shown), such as a microphone, joy stick, game pad, satellite dish, scanner, or the like. These and other input devices are often connected to the processing unit 321 through a serial port interface 346 coupled to system bus 323. Alternatively, the input devices may be connected by other interfaces, such as a parallel port, a game port or a universal serial bus (USB). A monitor 347 or another display device is also connected to system bus 323 via an interface, such as video adapter 348. In addition to the monitor, personal computers typically include other peripheral output devices (not shown), such as speakers and printers.

The computer 320 may operate in a networked environment using logical connections to one or more remote computers, such as remote computers 349a and 349b. Remote computers 349a and 349b may each be another personal computer, a server, a router, a network PC, a peer device or other common network node, and typically include many or all of the elements described above relative to the computer 320, although only memory storage devices 350a and 350b and their associated application programs 336a and 336b have been illustrated in FIG. 3. The logical connections depicted in FIG. 3 include a local area network (LAN) 351 and a wide area network (WAN) 352 that are presented here by way of example and not limitation. Such networking environments are commonplace in office-wide or enterprise-wide computer networks, intranets and the Internet.

When used in a LAN networking environment, the computer 320 is connected to the local network 351 through a network interface or adapter 353. When used in a WAN networking environment, the computer 320 may include a modem 354, a wireless link, or other means for establishing communications over the wide area network 352, such as the Internet. The modem 354, which may be internal or external, is connected to the system bus 323 via the serial port interface 346. In a networked environment, program modules depicted relative to the computer 320, or portions thereof, may be stored in the remote memory storage device. It will be appreciated that the network connections shown are exemplary and other means of establishing communications over wide area network 352 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for use in a computing system containing a database of available documents that are to be searched using one or more key terms, the method searching the database to identify a plurality of documents for subsequent presentation in a ranked order, and comprising:
    using a ranking algorithm on documents identified by an inverted index as containing one or more key terms to create a special list for at least one key term, the special list for the at least one key term ranking a predetermined number of highest ranked documents identified in the inverted index as containing the at least one key term, wherein the ranking algorithm ranks documents in the special list according to a form consisting of Rank=(tf/K+tf), where K=dl/avdl, and wherein tf is occurrence of a key term in a document, dl is document length, and avdl is an average document length;
    appending the special list to the inverted index and storing the inverted index on one or more computer readable storage medium, the inverted index having separate portions for each key term, and the portion for the at least one key term including:
        a listing of documents that contain the at least one key term;
        within the listing of documents, occurrence data for each of those documents; and
        the special list for the at least one key term, the special list being separate from the listing of documents;
    at a server computing device, receiving a user request for a search of the at least one key term, the user request also including a speed and thoroughness level for searching for the at least one key term;
    at the server computing device, accessing the inverted index and the portion of the inverted index corresponding to the at least one key term;
    at the server computing device, searching one or both of the inverted index and the special list for documents containing the at least one key term, such that:
        when the speed and thoroughness level is a minimum thoroughness, only the special list is searched;
        when the speed and thoroughness level is a maximum thoroughness, all relevant entries in the listing of documents in the inverted index are searched; and
        when the speed and thoroughness level is between the minimum and maximum thoroughness, the special list is searched along with only a portion of relevant entries in the listing of documents within the inverted index.

2. A method as recited in claim 1, wherein the act of searching the special list is performed with one or more search engines.

3. A method as recited in claim 1, wherein the documents include web pages.

4. A method as recited in claim 1, wherein a special list is created for each key term identified by the inverted index and that has at least a minimum number of documents associated therewith in the inverted index.

5. A method as recited in claim 1, further including searching the inverted index for additional documents, wherein searching the inverted index for additional documents corresponds to a single user initiated search query also used to search the special list for documents, and is performed subsequent to searching the special list.

6. A method as recited in claim 5, wherein a user can control to what extent the inverted index is searched for additional documents.

7. A method as recited in claim 5, wherein one or more ranking algorithms are applied to any additional documents that are identified in the search of the inverted index subsequent to searching the special list.

8. A method as recited in claim 1, further including modifying the special list after it has been created.

9. A method as recited in claim 1, further comprising creating the inverted index, and wherein creating the inverted index includes:
    identifying documents to be indexed for subsequent searching by one or more search engines;
    identifying key terms that occur within the identified documents; and creating one or more indices that associate the identified key terms and, for each key term, documents that contain each key term.

10. A method as recited in claim 9, wherein creating the inverted index further includes merging the one or more indices into a single inverted index.

11. A method as recited in claim 10, wherein the ranking algorithm is applied to at least some of the documents during merging.

12. A method as recited in claim 1, wherein the special list is appended to a portion of the inverted index that relates to the at least one key term to which the special list corresponds.

13. A method as recited in claim 1, wherein the at least one key term is a symbol.

14. A method as recited in claim 1, wherein at least some of the information used in ranking documents for the special list is included in the occurrence data within the listing of documents.

15. A method as recited in claim 14, wherein there are multiple special lists for multiple key terms, and wherein portions of the inverted index corresponding each of the multiple key terms have a corresponding special list.

16. A method as recited in claim 1, wherein the minimum thoroughness corresponds to a maximum speed, and wherein the maximum thoroughness corresponds to a minimum speed.

17. A computer program product for use in a computing system containing a database of available documents that is to be searched using one or more key terms, the computer program product enabling the computing system to search the database to identify a plurality of documents for subsequent presentation in a ranked order, the computer program product comprising:

one or more computer-readable storage media having computer-executable instructions encoded thereon for causing a computing system to:

apply a ranking algorithm on documents identified by an inverted index as containing one or more key terms to create a special list for at least one key term, the special list for the at least one key term ranking a predetermined number of highest ranked documents identified in the inverted index as containing the at least one key term, wherein the ranking algorithm ranks documents in the special list according to a form consisting of: Rank=(tf/K+tf), where K=dl/avdl, and wherein tf is occurrence of a key term in a document, dl is document length, and avdl is an average document length;

append the special list to the inverted index, the inverted index having separate portions for each key term and the portion for the at least one key term including:

a listing of documents that contain the at least one key term;

within the listing of documents, occurrence data for each of those documents; and the special list for the at least one key term, the special list being separate from the listing of documents;

receive a user request for a search of the at least one key term, the user request also including a speed and thoroughness level for searching for the at least one key term;

access the inverted index and the portion of the inverted index corresponding to the at least one key term;

search one or both of the inverted index and the special list for documents containing the at least one key term, such that:

when the speed and thoroughness level is a minimum thoroughness, only the special list is searched;

when the speed and thoroughness level is a maximum thoroughness, all relevant entries in the listing of documents in the inverted index are searched; and when the speed and thoroughness level is between the minimum and maximum thoroughness, the special list is searched along with only a portion of relevant entries in the listing of documents in the inverted index.

18. A computer program product as recited in claim 17, wherein the documents include a web page.

19. A computer program product as recited in claim 17, wherein the documents include a document other than a web page.

20. A computer program product as recited in claim 17, wherein a special list is created for each key term identified by the index.

21. A computer program product as recited in claim 20, wherein each key term includes at least one of a word, a letter, a number and a symbol.

22. A computer program product as recited in claim 17, wherein the computer-executable instructions are encoded to further cause the computing system to search the inverted index for additional documents, subsequent to searching the special list, and corresponding to a single user-initiated search query also used in the search of the special list for documents.

23. A computer program product as recited in claim 17, wherein the computer-executable instructions are encoded to further cause the computing system to modify the special list after it has been created.

24. A method for searching a database of available documents for later presentation to a user in a ranked order, the method comprising:

at a web-based search engine on a server computing device, receiving a user-initiated search request that identifies one or more key terms to be searched for in the database of available documents;

at the web-based search engine on a server computing device, receiving a user indication of a speed and thoroughness level for searching the database of available documents for the one or more key terms;

accessing an inverted index stored on computer-readable storage media, the inverted index having terms found within documents in the database, the inverted index having separate portions for each term and each portion of a respective term including:

a listing of those documents that contain the respective term;

within the listing of those documents that contain the respective term, occurrence data for each of those documents; and a special list specific to the respective term and appended to the inverted index apart from the listing of those documents that contain the respective term, the special list identifying a predetermined number of highest ranked documents from the listing, the special list ranking corresponding documents according to a form consisting of Rank=(tf/K+tf), where K=dl/avdl, and wherein tf is occurrence of a key term in a document, dl is document length, and avdl is an average document length; and accessing inverted index portions for terms corresponding to each of the one or more key terms, and:

when the user indication of the speed and thoroughness level is a first thoroughness, searching only the special lists corresponding to the one or more key terms;

when the user indication of the speed and thoroughness level is a second thoroughness, searching all relevant entries in the inverted index; and when the user indication of the speed and thoroughness level is a third thoroughness between the fist thoroughness and the second thoroughness, searching the special lists corresponding to the one or more key terms and only a portion of other relevant entries in the inverted index.

\* \* \* \* \*